US009438690B2

United States Patent
Tonev et al.

(10) Patent No.: US 9,438,690 B2
(45) Date of Patent: Sep. 6, 2016

(54) SYSTEM AND METHOD FOR INSERTING OWNED MEDIA CONTENT INTO MOBILE APPLICATIONS

(71) Applicant: Zumobi, Inc., Seattle, WA (US)

(72) Inventors: Georgi Tonev, Seattle, WA (US); Wade Tsai, Seattle, WA (US); Emmanuel Pinault, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 0 days.

(21) Appl. No.: 14/563,925

(22) Filed: Dec. 8, 2014

(65) Prior Publication Data

US 2016/0165001 A1  Jun. 9, 2016

(51) Int. Cl.
*G06K 5/00* (2006.01)
*H04L 29/08* (2006.01)
*G06F 17/30* (2006.01)
*H04L 29/06* (2006.01)

(52) U.S. Cl.
CPC ....... *H04L 67/306* (2013.01); *G06F 17/30997* (2013.01); *H04L 63/062* (2013.01)

(58) Field of Classification Search
CPC .............. G06Q 20/203; G07F 7/1016
USPC ......................... 235/380, 382, 383
See application file for complete search history.

(56) References Cited

U.S. PATENT DOCUMENTS

| | | | |
|---|---|---|---|
| 2008/0320560 A1* | 12/2008 | Casey | H04L 63/10 726/3 |
| 2009/0058635 A1* | 3/2009 | LaLonde | A61N 1/37282 340/539.11 |
| 2009/0248883 A1* | 10/2009 | Suryanarayana | G06F 9/4443 709/229 |
| 2014/0164514 A1* | 6/2014 | Eteminan | H04L 29/06176 709/204 |
| 2014/0223573 A1* | 8/2014 | Reedy | G06F 21/6218 726/26 |

* cited by examiner

*Primary Examiner* — Daniel St Cyr
(74) *Attorney, Agent, or Firm* — Norton Rose Fulbright US LLP

(57) ABSTRACT

A method includes transmitting a request to a server from a mobile device. The request may be initiated by an application executing on the mobile device. The method includes receiving a message at the mobile device from the server. The message may include first validation information and information indicating a location where the mobile device can retrieve content. The method includes retrieving the content from the location indicated in the message, and generating second validation information based on the retrieved content. The method includes validating the content based on a comparison of the first validation information and the second validation information. The method includes selectively storing the content based on whether the validation of the content indicates the content is valid. The content may be stored for subsequent publication at the mobile device via the application. The content may be published while the mobile device is offline.

45 Claims, 3 Drawing Sheets

SYSTEM AND METHOD FOR INSERTING OWNED MEDIA CONTENT INTO MOBILE APPLICATIONS

TECHNICAL FIELD

The present application relates to publication of content, and more particularly, publication of owned content to an application executing on a mobile device.

BACKGROUND

Use of mobile devices has become widespread. As the use of mobile devices has grown, so has the data processing capabilities and data transfer rates of such mobile devices. Because of these increases in data processing capabilities and data transfer rates, a user of a mobile device is able to use the mobile device to access content using a wireless network connection (e.g., a cellular data network connection). One such way that users access content is through web searches using a web browser capability of the mobile device. Another way that users access content is through mobile applications (e.g., programs designed to be executed on mobile devices). Some mobile applications provide content to users through web links. For example, a mobile application provider may transmit information to the mobile device or the application may retrieve information from a server provided by the mobile application provider. Such information may be in the form of a link to a web page that, when selected by the user, initiates the web browser capability of the mobile device and navigates the web browser to a web page that contains the information. However, such techniques are limited in that accessing the content requires the mobile device to have an active connection to a wireless network (e.g., a cellular data network used to access the web page in response to a selection of the link). Additionally, such techniques do not provide for secure delivery of content to the mobile device and/or validation that the content is valid (e.g., is content provided from the mobile application provider).

BRIEF SUMMARY

The present application provides systems, methods, and computer-readable storage media that provide secure delivery of content from a content provider to a mobile device. Additionally, the systems, methods, and computer-readable storage media disclosed in the present application provide for validation that the content had not been tampered with or altered prior to publishing the content to a mobile application executing on the mobile device, and enable a user of the mobile device to access the content via the application without requiring an active connection to a wireless network (e.g., a cellular data network).

In an aspect, a computer-readable storage medium storing instructions is disclosed. The instructions, when executed by a processor, cause the processor to perform operations that include receiving, by a server, content from a content provider, generating, by the server, validation information associated with the content received from the content provider, and storing the content and the validation information in a database accessible to the server. In an aspect, the validation information may be a checksum, a hash value, etc. The operations include receiving a request for the content at a server via a network from a mobile device, and identifying content to be provided to the mobile device in response to the request. In an aspect, the request may include a secret generated by the mobile device, and the request may be encrypted with a public-key of the server. The operations also include generating a first message that includes validation information associated with the identified content and information indicating a location where the identified content can be retrieved by the mobile device. The validation information may enable the mobile device to validate that the retrieved content has not been altered. The operations include initiating transmission of the message from the server to the mobile device. In an aspect, the message may include the secret included in the request. The mobile device may use the validation information and/or the secret to determine whether to retrieve the content and to determine whether the retrieved content is valid.

In an additional or alternative aspect, a method includes receiving, by a server, content from a content provider, generating, by the server, validation information associated with the content received from the content provider, and storing the content and the validation information in a database accessible to the server. In an aspect, the validation information may be a checksum, a hash value, etc. The method includes receiving a request for the content at a server via a network from a mobile device, and identifying content to be provided to the mobile device in response to the request. In an aspect, the request may include a secret generated by the mobile device, and the request may be encrypted with a public-key of the server. The method also includes generating a first message that includes validation information associated with the identified content and information indicating a location where the identified content can be retrieved by the mobile device. The validation information may enable the mobile device to validate that the retrieved content has not been altered. The method includes initiating transmission of the message from the server to the mobile device. In an aspect, the message may include the secret included in the request. The mobile device may use the validation information and/or the secret to determine whether to retrieve the content and to determine whether the retrieved content is valid.

In another additional or alternative aspect, an apparatus including a processor and a memory is disclosed. The memory may store instructions executable by the processor. The instructions, when executed by the processor, may cause the processor to perform operations that include receiving, by a server, content from a content provider, generating, by the server, validation information associated with the content received from the content provider, and storing the content and the validation information in a database accessible to the server. In an aspect, the validation information may be a checksum, a hash value, etc. The operations include receiving a request for the content at a server via a network from a mobile device, and identifying content to be provided to the mobile device in response to the request. In an aspect, the request may include a secret generated by the mobile device, and the request may be encrypted with a public-key of the server. The operations also include generating a first message that includes validation information associated with the identified content and information indicating a location where the identified content can be retrieved by the mobile device. The validation information may enable the mobile device to validate that the retrieved content has not been altered. The operations include initiating transmission of the message from the server to the mobile device. In an aspect, the message may include the secret included in the request. The mobile device may use the validation information and/or the secret to determine whether to retrieve the content and to determine whether the retrieved content is valid.

In a further aspect, an apparatus including a processor and a memory is disclosed. The memory may store instructions executable by the processor. The instructions, when executed by the processor, may cause the processor to perform operations that include transmitting a request to a server from a mobile device. Transmission of the request may be initiated by an application executing on the mobile device. In an aspect, the request may be a request for content to be published or presented to a user of the mobile device. In an aspect, the mobile device may generate a secret and may include the secret in the request. In an aspect, the request may be encrypted using a public-key of the server. The operations include receiving a message at the mobile device from the server. The server may transmit the message to the mobile device in response to the request, and the message includes first validation information and information indicating a location where the mobile device can retrieve content. In an aspect, the request may include the secret generated by the mobile device. The operations also include retrieving the content from the location indicated in the message, generating second validation information based on the retrieved content, and validating the content based on a comparison of the first validation information and the second validation information. The operations also include selectively storing the content based on whether the validation of the content indicates the content is valid. The mobile device may use the validation information and/or the secret to determine whether to retrieve the content and to determine whether the retrieved content is valid. When the mobile device determines, based on the secret and/or the validation information, that the content is valid and should be retrieved, the mobile device may retrieve the content and store the content. The content may be stored at the mobile device for subsequent publication via the application.

In a further additional or alternative aspect, a method includes transmitting a request to a server from a mobile device. Transmission of the request may be initiated by an application executing on the mobile device. In an aspect, the request may be a request for content to be published or presented to a user of the mobile device. In an aspect, the mobile device may generate a secret and may include the secret in the request. In an aspect, the request may be encrypted using a public-key of the server. The method includes receiving a message at the mobile device from the server. The server may transmit the message to the mobile device in response to the request, and the message includes first validation information and information indicating a location where the mobile device can retrieve content. In an aspect, the request may include the secret generated by the mobile device. The method also includes retrieving the content from the location indicated in the message, generating second validation information based on the retrieved content, and validating the content based on a comparison of the first validation information and the second validation information. The method includes selectively storing the content based on whether the validation of the content indicates the content is valid. The mobile device may use the validation information and/or the secret to determine whether to retrieve the content and to determine whether the retrieved content is valid. When the mobile device determines, based on the secret and/or the validation information, that the content is valid and should be retrieved, the mobile device may retrieve the content and store the content. The content may be stored at the mobile device for subsequent publication via the application.

In yet another additional or alternative aspect, a computer-readable storage medium storing instructions is disclosed. The instructions, when executed by a processor, cause the processor to perform operations that include transmitting a request to a server from a mobile device. Transmission of the request may be initiated by an application executing on the mobile device. In an aspect, the request may be a request for content to be published or presented to a user of the mobile device. In an aspect, the mobile device may generate a secret and may include the secret in the request. In an aspect, the request may be encrypted using a public-key of the server. The operations include receiving a message at the mobile device from the server. The server may transmit the message to the mobile device in response to the request, and the message includes first validation information and information indicating a location where the mobile device can retrieve content. In an aspect, the request may include the secret generated by the mobile device. The operations also include retrieving the content from the location indicated in the message, generating second validation information based on the retrieved content, and validating the content based on a comparison of the first validation information and the second validation information. The operations also include selectively storing the content based on whether the validation of the content indicates the content is valid. The mobile device may use the validation information and/or the secret to determine whether to retrieve the content and to determine whether the retrieved content is valid. When the mobile device determines, based on the secret and/or the validation information, that the content is valid and should be retrieved, the mobile device may retrieve the content and store the content. The content may be stored at the mobile device for subsequent publication via the application.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
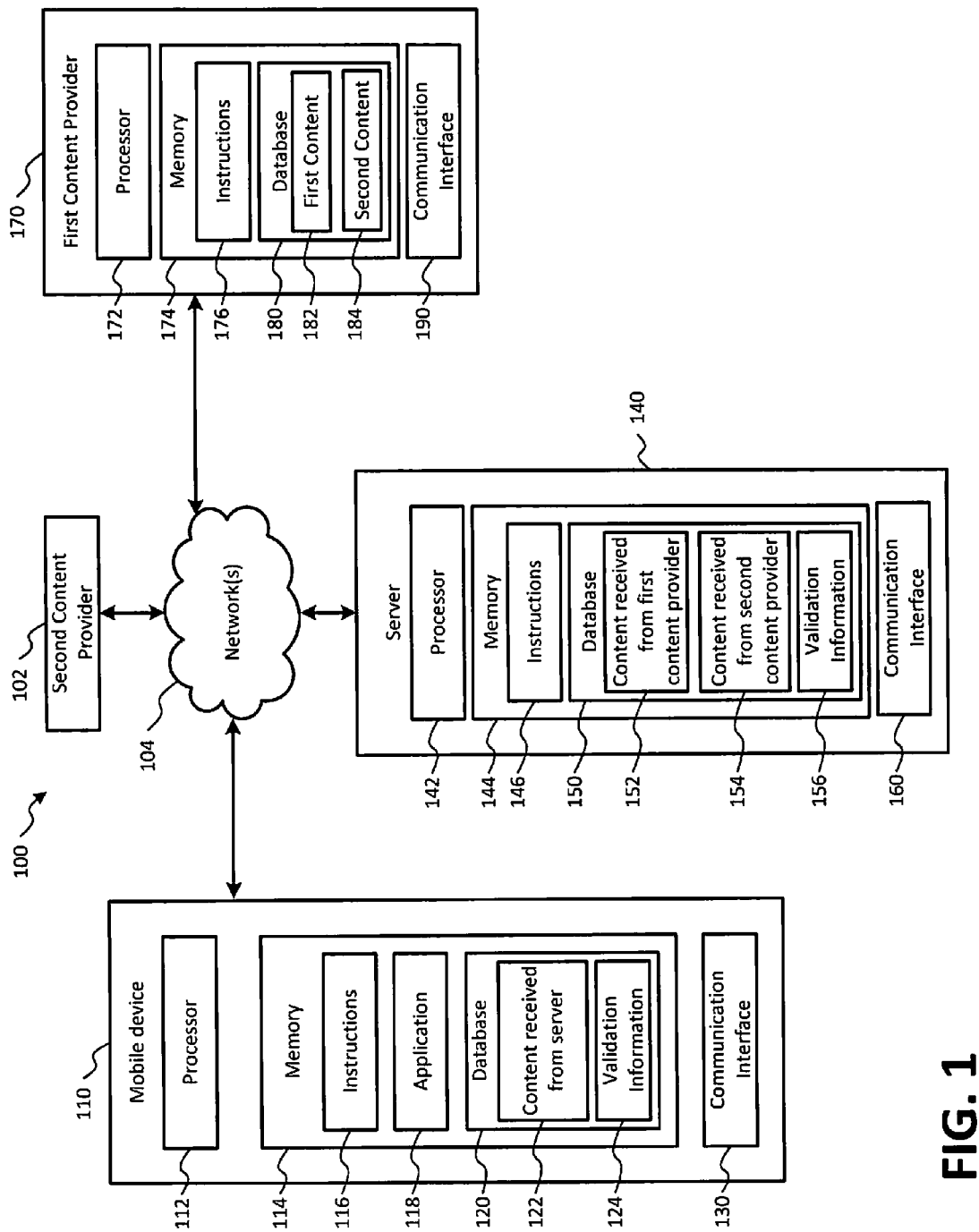
FIG. 1 is a block diagram of an exemplary system for distributing and publishing owned content via applications executing on a mobile device.

Referring to FIG. 1, a block diagram of an exemplary system for distributing and publishing owned content via applications executing on a mobile device is shown as a system 100. As shown in FIG. 1, the system 100 includes a mobile device 110, a server 140, a first content provider device 170, a second content provider device 102, and a network(s) 104. The system 100 may facilitate validation of owned content provided for publication at the mobile device 110 by the first content provider device 170 and the second content provider device 102, as described in detail below.

The mobile device 110 may be a smartphone, a tablet computing device, a computer system of a vehicle, a smart television, a personal digital assistant (PDA), a smart watch, a global positioning system (GPS) device, etc. The mobile device 110, includes a processor 112, a memory 114, and a communication interface 130. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the processor 112, cause the processor 112 to perform operations described in connection with the mobile device 110 with reference to FIGS. 1-3. The memory 114 may also store an application 118. As described in more detail below, the application 118 may receive content via the network 104, and publish the content at the mobile device 110. As described further below, publication of the content at the mobile device 110 may include making the content available for access by a user of the mobile device 110. In an aspect, the application 118 stored at the memory 114 as the instructions 116.

The communication interface 130 may be configured to communicatively couple the mobile device 110 to one or more networks, such as the network 104, as shown in FIG. 1. The communication interface 130 may be configured to communicatively couple the mobile device 110 to the network 104 via a wired or wireless connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) protocol, a 4th Generation (4G)/long term evolution (LTE) protocol, etc.).

The network 104 may be a wired network, a wireless network, or may include a combination of wired and wireless networks. For example, the network 104 may include a local area network (LAN), a wide area network (WAN), a wireless WAN, a wireless LAN (WLAN), a metropolitan area network (MAN), a wireless MAN network, a cellular data network, a cellular voice network, the internet, other types of public and private networks, or a combination thereof. Additionally, the network 104 may include multiple networks operated by different entities. For example, the network 104 may include a first network (e.g., a virtual private network (VPN)) operated by a first operator, and a second network (e.g., a LAN, WAN, WLAN, wireless WAN, a cellular data network, etc.) operated by a second operator. To illustrate, the first network may be a VPN network provided by an operator of the server 140, and the second network may be a cellular data network provided by a cellular network service provider. The first network may provide a secure connection from the first content provider device 170 to the server 140 for securely providing content to the server 140, and the second network may provide a connection between the mobile device 110 and the server 140 for distribution of the content to the mobile device 110.

As shown in FIG. 1, the server 140 includes a processor 142, a memory 144, and a communication interface 160. The memory 144 may include ROM devices, RAM devices, one or more HDDs, flash memory devices, SSDs, other devices configured to store data in a persistent or non-persistent state, or a combination of different memory devices. The memory 144 may store instructions 146 that, when executed by the processor 142, cause the processor 142 to perform operations described in connection with the server 140 with reference to FIGS. 1-3. The communication interface 160 may be configured to communicatively couple the server 140 to one or more networks, such as the network 104, as shown in FIG. 1. The communication interface 160 may be configured to communicatively couple the server 140 to the network 104 via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.).

In an aspect, the server 140 may be a laptop computing device, a personal computing device, a tablet computing device, a point of sale (POS), a handheld POS, a smartphone, a mobile communication device, or any other electronic device operable to perform the operations of the server 140, as described with reference to FIGS. 1-3. As shown in FIG. 1, the memory 144 may include a database 150. The database 150 may store content 152 (e.g., content received from the first content provider device 170) and content 154 (e.g., content received from the second content provider device 102. In an aspect, the database 150 may be stored at another device, such as a network attached storage (NAS) device communicatively coupled to the server 140, or may be stored at a storage area network (SAN) communicatively coupled to the server 140. Additionally or alternatively, the database 150 may be stored at a removable storage device (e.g., an external HDD, a flash drive, etc.) coupled to the server 140. Furthermore, the database 150 may be stored across multiple storage devices (e.g., in a redundant array of independent disks (RAID) configuration or across storage devices located at geographically disparate locations) integrated with or otherwise accessible to the server 140. The database 150 may store validation information 156. The validation information 156 may be provided to mobile devices for use in validating that content retrieved by the mobile devices is valid content, as described further below.

As shown in FIG. 1, the first content provider device 170 may include a processor 172, a memory 174, and a communication interface 190. The memory 174 may include ROM devices, RAM devices, one or more HDDs, flash memory devices, SSDs, other devices configured to store data in a persistent or non-persistent state, or a combination of different memory devices. The memory 174 may store instructions 176 that, when executed by the processor 172, cause the processor 172 to perform operations described in connection with the first content provider device 170 with reference to FIGS. 1-3. The communication interface 190 may be configured to communicatively couple the first content provider device 170 to one or more networks, such as the network 104, via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.).

In an aspect, the first content provider device 170 may be a web server providing access to a website provided by the first content provider or an online service provided by the first content provider. In an additional or alternative aspect, the first content provider device 170 may be a laptop computing device, a personal computing device, a tablet computing device, a POS, a handheld POS, a smartphone, a mobile communication device, or any other electronic device operable to perform the operations of the first content provider device 170, as described herein with reference to FIGS. 1-3. The memory 174 may include a database 180 storing first content 182 and second content 184. In an aspect, the content 152 stored at the database 150 of the server 140 may include the first content 182 and the second content 184. In an aspect, the database 180 may be stored at another device, such as a network attached storage (NAS) device communicatively coupled to the first content provider device 170, or may be stored at a storage area network (SAN) communicatively coupled to the first content provider device 170. Additionally or alternatively, the database 180 may be stored at a removable storage device (e.g., an external HDD, a flash drive, etc.) coupled to the first content provider device 170. Furthermore, the database 180 may be stored across multiple storage devices (e.g., in a redundant array of independent disks (RAID) configuration or across storage devices located at geographically disparate locations) integrated with or otherwise accessible to the first content provider device 170.

In an aspect, the second content provider device 102 may include components similar to the components included in the first content provider device 170 (e.g., a processor, memory, a database, etc.). In an aspect, the first content provider and/or the second content provider may be financial services entities (e.g., banks, investment service providers, credit card companies, or any other entity offering financial services). In an additional or alternative aspect, the first content provider and/or the second content provider may be manufacturers (e.g., car manufacturers, home builders, computer/electronics manufacturers, etc.). In yet another additional or alternative aspect, the first content provider and the second content provider may be retailers (e.g., automobile retailers, computer/electronics retailer, digital file/media retailers, etc.). Further, it is noted that while the first content provider and the second content provider may be entities corresponding to the specific examples provided herein, such examples are provided by way of illustration, rather than by way of limitation, and the first content provider and the second content provider may be any type of entity that may distribute content (e.g., products, services, information, multimedia, etc.) to users. Further illustrative aspects of distribution of content by the first content provider and the second content provider of FIG. 1 are provided below.

During operation of the system 100, the server 140 may receive a plurality of content via the network 104. For example, the first content provider device 170 may provide content (e.g., the first content 182 and the second content 184) to the server 140. In an aspect, the content provided to the server 140 by the first content provider device 170 may include text content, video content, audio content, etc. For example, when the first content provider is a financial services entity (e.g., a bank), the first content 182 provided from the first content provider device 170 to the server 140 may correspond to information related to one or more financial services provided by the first content provider (e.g., investment news and analysis for stocks that customers of the first content provider may be invested in, information regarding loan interest rates, new account features or product offerings, enhancements to or expected outages for a website operated by the first content provider, etc.). As another example, when the first content provider is an automobile manufacturer, the first content 182 provided from the first content provider device 170 to the server 140 may correspond to information related to automobiles manufactured by the first content provider, articles and reviews regarding vehicles manufactured by the first content provider, discounts on service at authorized automotive retailers associated with the first content provider, etc. In an additional or alternative aspect, the server 140 may periodically pull the content from the content providers (e.g., the first content provider device 170 and the second content provider device 102). Thus, in at least some aspects, the server 140 of FIG. 1 is configured to receive content pushed to the server 140 by the content providers and/or to automatically pull the content from the content providers.

The server 140 may categorize the content stored at the database 150. In an aspect, the server 140 may categorize the content based on information included in the content (e.g., is the content related to an automobile, a stock or stock symbol, a product, a service, a financial entity, a retailer, a manufacturer, a news story, etc.), based on whether the respective content includes multimedia content (e.g., audio content, video content, image content, etc.), based on whether the content is received from a social media source (e.g., a social media source or social media outlet associated with the content provider), based on a type of the social media source (e.g., a social networking source, a micro-blogging social media source, a streaming video source, etc.), based on a profile associated with a user of the mobile device 110, based on a group profile associated with a group of users of mobile devices that includes the user of the mobile device 110, or a combination thereof.

In an aspect, the server 140 may tag the content stored at the database 150 based at least in part on a categorization of the content. For example, the server 140 may add tagging information to the content stored at the database 150. The tagging information may indicate the type of information included in the content (e.g., a particular type of automobile, whether the content is associated with a news story, a manufacturer, a retailer, a financial entity, a product, a service, etc.). Additionally, the tagging information may identify the content source (e.g., whether the content was received from the first content provider or the second content provider), may indicate whether the content was previously distributed or is to be distributed via a social media source (e.g., whether the content was also distributed by the content provider via a social networking source, a micro-blogging source, a streaming video source, etc.), may indicate a date and time the content was distributed or is to be distributed via the social media source, a size of the content, etc. In an additional or alternative aspect, the tagging information may include keywords associated with the content. For example, when the content is associated with a particular automobile, the tagging information may include one or more keywords descriptive of the particular automobile (e.g., a model of the particular automobile, make of the automobile, year of the particular automobile, etc.).

In an additional or alternative aspect, the tagging information may include types of profiles for which the content may be of interest. For example, a profile associated with the mobile device 110 may indicate that a user of the mobile device 110 has an application (e.g., the application 118) installed. The application may be provided to the mobile device 110 by the first content provider via an application store, as described above. When the content is provided to the server 140 by the first content provider, the tagging information may indicate that the content (e.g., the content 152) may be of interest to the user of the mobile device 110 because the user's profile indicates the application provided by the first content provider (e.g., the application 118) is installed on the mobile device 110. The tagging information may indicate that the content 152 provided to the server 140 by the first content provider device 170 may also be of interest to other users of other mobile devices on which the application 118 has been installed. Thus, the categorization and tagging of content may facilitate targeted distribution of content from the database 150 to mobile devices associated with users that may find the content of interest.

The server 140 may receive a request for content from the mobile device 110. In an aspect, the request may be initiated by an instance the application 118 executing on the mobile device 110. In an aspect, the application 118 may generate the request while executing as a background process at mobile device 110. The application 118 may be configured to cause the mobile device 110 to periodically transmit the request independent of user interaction with the application 118. In an additional or alternative aspect, the application 118 may generate the request in response to the user of the mobile device 110 opening the application 118 or in response to receiving a message from the server 140 indicating that new content that may be of interest to the user of the mobile device 110 is available from the server 140.

The application 118 may be configured to cause the mobile device 110 to initiate transmission of the request to the server 140 via the networks 104 using the communication interface 130. The request may be transmitted from the mobile device 110 to the server 140 using private key infrastructure (PKI) and transport layer security (TLS) protocols. In some aspects, the request may be initiated by the application 118 only when the mobile device 110 is connected to a non-cellular network. Alternatively or additionally, the request may indicate that only text content should be provided (e.g., when the request is being transmitted via a cellular data network). This may reduce the rate at which a data plan associated with the user's mobile device 110 is consumed, and reduce a likelihood that the transmission of content will cause the user to incur additional charges for exceeding the data plan limits.

The request may include information that identifies the application that originated the request. For example, the request may include information that indicates that the application 118 generated the request and that the application 118 is associated with the first content provider. In an aspect, the request may be encrypted (e.g., using private-key/public-key encryption or another technique). For example, the server 140 and the mobile device 110 may utilize a public key infrastructure (PKI) over transport layer security (TLS) for transmitting communications between the server 140 and the mobile device 110. In an aspect, the application 118 may encrypt the request using a public-key associated with the server 140. In an aspect, the mobile device 110 may generate a secret and may include the secret in the request transmitted to the server 140. In an aspect, the secret may be encrypted using the public-key associated with the server 140. In an aspect, the secret may be a one-time use secret and the mobile device 110 may generate a new secret each time that the mobile device 110 transmits a request for content to the server 140. In an additional or alternative aspect, the secret may be valid for a period of time (e.g., one day, one week, one month etc.), may be valid for a particular number of requests (e.g., two requests, ten requests, etc.), or may be valid for a combination of a period time and a maximum number of requests (e.g., up to five requests within one day, one week, etc.). If the maximum number of requests is reached during the period of time, or the period of time expires before the maximum number of requests is reached, the mobile device 110 may generate a new secret for use in transmitting requests to the server 140.

The server 140 may decrypt the request using its private key to determine the information included in the request (e.g., an identity of the application 118, a profile associated with the user of the mobile device 110, a content provider that provided the application 118, etc.). If the server 140 is successful in decrypting the request using its private key, the server 140 may generate a response including information that may be used by the mobile device 110 to access or retrieve the requested content, as described in detail below. In an aspect, the server 140 may decrypt the secret included in the request received from the mobile device 110 using its private key, and, if the secret and the request are decrypted successfully, the server 140 may generate the response including the information that may be used by the mobile device 110 to access or retrieve the requested content. If the server 140 is unable to decrypt the request and/or the secret using its private key, the server 140 may transmit an error message to the mobile device 110. The error message may indicate that the request was corrupted or could not otherwise be processed, and the mobile device 110, in response to receiving the error message, may generate and transmit a new request for content to the server 140. In an aspect, the mobile device 110 may generate a new secret whenever a new request is generated in response to receiving an error message from the server 140. This may enhance the security of the system 100.

For example, the requests may fail because the request may have been intercepted and altered during transmission of the request from the mobile device 110 to the server 140. By generating a new secret, the mobile device 110 may verify that any subsequent response from the server 140 is valid. That is, if a device intercepted and obtained the secret, and may attempt to spoof the server 140 by transmitting the secret back to the mobile device 110. However, as described in more detail below, the mobile device 110 may verify that the secret transmitted to the server 140 matches the secret included in the response received from the server 140. By changing the secret whenever an error is detected, the mobile device 110 may be able to distinguish responses from the server 140 from responses of devices that may attempt to spoof the server 140 using an invalid secret.

In an aspect, the server 140 may determine, based on the information included in the request, a provider of the application 118 executing on the mobile device 110, and may identify content to be provided to the mobile device 110 based on a determination that content has been received at the server 140 from sources associated with the provider. In an aspect, the information included in the request may include a timestamp indicating a last time that the application 118 transmitted a request to the server 140. The timestamp may be used by the server 140 to determine whether new content has been received from the first content provider subsequent to the last time that the application 118 transmitted the request to the server 140. When no new content has been received, the server 140 may transmit a response including information indicating that the application 118 is up-to-date to the mobile device 110. In an aspect, the response may include the secret transmitted to the server 140 by the mobile device 110. If the secret included in the response matches the secret transmitted to the server 140, then the mobile device 110 may determine that the response received from the server 140 is valid, and may determine that no further action is required since the response indicates no new content is available. If the secret included in the response does not match the secret transmitted to the server 140, the mobile device 110 may determine that the response is invalid, and may generate a new secret and a new request for content and transmit the new request to the server 140.

When new content has been received, the server 140 may generate and store validation information 156 (e.g., a checksum, a hash value, etc.) that may be provided to the mobile device 110 to validate the new content. For example, in an aspect, the server 140 may identify content to be provided to the mobile device 110 in response to the request and generate the validation information based on the identified new content. The server 140 may transmit a response to the mobile device 110, and the response may include the validation information. Additionally, the response may include information that indicates a location where the identified content may be retrieved (e.g., a database or a location within the database where the identified new content may be retrieved by the mobile device 110). In an aspect, the application 118 may be pre-configured by the provider of the application 118 (e.g., the first content provider) with information (e.g., a hash function, etc.) used to perform the validation of the content 152. For example, as shown in FIG. 1, validation information 124 may be stored at a database 120. The validation information 124 may include information that may be used to generate validation information for content received from multiple content providers, with each content provider being associated with a different algorithm. In an aspect, the validation information 124 (e.g., the information used to generate validation information) may be stored as part of the instructions 116, and may be distinct for each application. In an aspect, the response may further include the secret transmitted from the mobile device 110 to the server 140 (e.g., the secret included in the request).

In response to receiving the response from the server 140, the mobile device 110, under the control of the application 118, may retrieve the identified new content using the location indicated in the message. After retrieving the identified new content, the application 118 may generate validation information (e.g., a checksum, a hash value, etc.) based on the retrieved content, and may perform a validation of the retrieved content to determine whether the retrieved content has been altered. For example, the application 118 may compare the validation information included in the response received from the server 140 with the validation information generated by the application 118. If the validation information received from the server 140 matches the validation information generated by the application 118, the application 118 may determine that the retrieved content is valid content, and may store the retrieved content in the database 120 as the content 122. Subsequently, the valid content may be published or presented to a user of the mobile device 110 via the application 118. If the validation information received from the server 140 does not match the validation information generated by the application 118, the application 118 may determine that the retrieved content has been tampered with or altered and generate a message indicating that the retrieved content is invalid. The application 118 may cause the mobile device 110 to transmit the message to the server 140. Additionally, when the validation information received from the server 140 does not match the validation information generated by the application 118, the application 118 may discard the content and may not publish or present the content to the user of the mobile device 110 via the application 118.

In an aspect, the mobile device 110 may further determine whether the secret included in the response received from the server 140 matches the secret included in the request transmitted from the mobile device 110 to the server 140. If the secret included in the response matches the secret included in the request, the mobile device 110 may determine that the response is valid, and may retrieve the content using the location indicated in the message. Upon retrieving the content in response to a determination that the secret included in the response matches the secret included in the request, the mobile device 110 may generate the validation information for comparison with the validation information included in the response received from the server 140. When the validation information included in the response received from the server 140 matches the validation information generated by the application 118, the application 118 may determine that the content is valid content, and the valid content may subsequently be published or presented to a user of the mobile device 110 via the application 118. If the secret included in the response does not match the secret included in the request, the mobile device 110 may determine that the content identified in the response is invalid, and may not retrieve the content identified in the response and may not generate the validation information for comparison with the validation information included in the response received from the server 140. Thus, when the response is determined invalid, the content is not retrieved and is not published or presented to the user of the mobile device 110 via the application 118.

A message received at the server 140 indicating that the retrieved content is invalid (e.g., either because the validation information included in the response does not match the validation information generated by the application 118, or because the secret included in the request for content does not match the secret included in the response from the server 140) may indicate that the database has been tampered with or that a connection between the server 140 (or the database 150) and the mobile device 110 has been compromised. In an aspect, the server 140 may determine whether the database 150 (or the content stored at the database 150) has been corrupted or compromised by generating second validation information for the content indicated as invalid by the message received from the mobile device 110. The server 140 may compare the second validation information to the validation information 156 generated when the content was received from the content provider. If the validation information 156 matches the second validation information, the server 140 may determine that the database has not been corrupted or compromised, and may determine that the connection between the server 140 (or the database 150) and the mobile device 110 has been compromised. The server 140 may reconfigure the connections to the database 150 (or take other actions to secure the connections to the database 150), and may transmit a message to the mobile device 110 indicating the new configuration of the connections to the database 150. The mobile device 110 may subsequently retrieve the content from the database 150 using the new configuration and perform the validation procedures described above (e.g., generate and compare validation information to validation information received from the server 140) to validate the subsequently retrieved content.

If the validation information 156 (e.g., the validation information generated in response to receiving the content from the content provider) does not match the second validation information, the server 140 may determine that the database 150 (or the content stored at the database 150) has been corrupted or compromised, and may isolate the database 150 (or the retrieved content within the database) from access by mobile devices, such as the mobile device 110, to prevent further distribution of the invalid content. In response to isolating the database 150, the server 140 may initiate retrieval of new copies of the isolated content from the content provider, and may generate a new database that may be subsequently used to distribute the content to applications executing on mobile devices. Additionally, the server 140 may generate new validation information in response to receiving the new copies of the content, and may replace the validation information 156 with the new validation information. In an aspect, the server 140 may transmit a message to the mobile device 110 indicating that the new copies of the content have been retrieved along with the new validation information. The mobile device 110 may retrieve the new copies of the content and perform operations to validate the new copies of the content (e.g., by generating validation information based on the retrieved new copies of the content and comparing the validation information to the new validation information received from the server 140). By validating the content at the mobile device 110, a likelihood that invalid content is distributed to, and published by application 118 executing on the mobile device 110 may be reduced.

In an aspect, the server 140 may validate content received from the content providers in a manner similar to the mobile device 110. For example, the server 140 may periodically poll the content providers for new content by transmitting a request to the content provider devices (e.g., the first content provider device 170 and the second content provider device 102). In an aspect, the requests transmitted to the content provider devices may be encrypted with public-keys associated with the respective content provider devices. In an additional aspect, the requests may include secrets (e.g., one time use secrets, secrets valid for a time period, secrets valid for a specific number of uses, or a combination thereof) generated by the server 140. When new content is available, the content providers may transmit a message to the server 140 indicating a database where the server 140 can retrieve the content, and including validation information generated by the content provider. In an aspect, the messages transmitted from the content providers to the server 140 may include the secret generated by the server, and the server 140 may validate the messages received from the content providers based on whether the secret received from a particular one of the content providers matches the secret included in the respect sent to the particular one of the content providers, as described above. The server 140 may retrieve the content from the database indicated in the message received from the content provider, and generate validation information associated with the retrieved content. In an aspect, the server 140 may selectively retrieve the content from the database indicated in the message based on whether the secret included in the message matches the secret transmitted from the server 140 to the content provider. The server 140 may then compare the validation information received from the content provider to the validation information generated by the server 140 to determine whether the retrieved content is valid (e.g., has not been tampered with). If the content is valid, the server 140 may store the content in the database 150 for distribution to appropriate mobile devices. If the content is invalid, the server 140 may transmit a message indicating that the content is invalid, and the content provider may take remedial measures (e.g., the measures described above with respect to the server 140) to provide valid content to the server 140. By validating the content at both the server 140, and at the mobile device 110, a likelihood that invalid content is distributed to, and published by mobile devices may be reduced.

Additionally, by validating the content provider in response to the request (e.g., using the information indicating a provider of the application 118), the server 140 may ensure that the content provided for publication via the application 118 is content owned by the first content provider (e.g., the provider of the application 118). The content owned by the first content provider may include content generated by the first content provider (e.g., the first content provider is the author of the content) and/or content generated by a party other than the first content provider that has been authorized for distribution on behalf of the first content provider. For example, a third party may generate a review of a product manufactured by the first content provider. The first content provider may authorize distribution of the review of the product to the application 118 by providing the review or information representative of the review to the server 140.

The server 140 may store the review or the information representative of the review in the database 150 as the content 152. Additionally, the server 140 may generate validation information 156 based on the content 152. In response to a request from the application 118, the server 140 may provide the validation information 156 and the location where the review or the information representative of the review to the application 118 may be retrieved by the mobile device 110. By only distributing owned content to the application 118, the first content provider may ensure that content published to users of the application 118 is content that has been approved by the first content provider as being accurate and/or as being representative of the first content provider's statements, points of view, product specifications, etc. Additionally, users of the application 118 may trust that the content published via the application 118 is accurate and may be relied upon with respect to the first content provider. This may increase the user's loyalty to the first content provider, and may increase a likelihood that the user of the application 118 continues to consume the content received from the first content provider device 170.

In response to a determination that the content retrieved from the database 150 is valid, the mobile device 110 may store the content at the database 120 as the content 122. Subsequently, the application 118 may publish the content 122 at the mobile device 110. In response to a determination that the content retrieved from the database 150 is invalid, the mobile device 110 may not store the retrieved content at the database 120. By storing the content at the database 120 at the memory of the mobile device 110, the content may subsequently be published via the application 118 irrespective of whether a network connection is available to the mobile device 110. Thus, the content is accessible to the user of the mobile device 110 at any time.

Publication of the content (e.g., the content 122) may include presenting the content during user interaction with the application 118 executing on the mobile device 110. In an aspect, the publication of the content may occur independent of whether a network connection is accessible to the mobile device 110 and/or irrespective of whether the mobile device 110 is connected to a network. In an aspect, publication of the content may occur as the user of the mobile device 110 interacts with the application 118. For example, the user may be browsing content using the application 118. The application 118 may determine that content being browsed by the user is similar to content stored at the database 120 and may publish the content to the user via the application (e.g., by presenting a thumbnail or a brief description of the content 122 at a display device, not shown in FIG. 1, of the mobile device 110).

The application 118 may determine whether the user interacts with the published content, and may generate feedback that includes information descriptive of whether the user interacts with the published content 122. The feedback may include information descriptive of user interaction with other content provided by or generated by the application 118 executing on the mobile device 110. For example, the feedback may include information descriptive of services or functions provided as part of the application 118 itself, as opposed to content provided to the mobile device 110 by the server 140. Stated another way, the application 118 may include functionality that is independent of the content provided to the application 118 by the server 140, and the feedback may include information descriptive of how the user utilizes such functionality. In an aspect, the content 122 may be complementary to built-in functionality of the application 118, and the content may be selectively published based on whether the content is complementary to built-in functionality that the user is interacting with.

For example, if the first content provider is a bank and the application 118 includes built-in functionality for checking investments that the user of the mobile device 110 has with the bank, the application 118 may publish content 122 relevant to the investments that the user has with the bank in response to detecting that the user is interacting with the built-in functionality for checking investments. As another example, the application 118 may include a built-in search feature that the user may use to search for content via the application 118. The application 118 may monitor the keywords entered by the user with respect to the built-in search feature and may selectively provide content in response to detecting that the keywords entered by the user corresponds to keywords included in tagging information associated with the content stored at the database 120. In an aspect, at least a portion of the content stored at the database 120 may be published by the application 118 in response to detecting a pre-determined characteristic associated with the user interaction with the other content provided by or generated by the application 118 executing on the mobile device.

In an aspect, the application 118 may be configured to periodically provide the feedback to the server 140. In an additional or alternative aspect, the application may periodically provide the feedback to a provider of the application 118 executing of the mobile device 110 (e.g., the first content provider device 170). In some aspects, the server 140 may provide at least a portion of the feedback to the provider of the application 118 executing of the mobile device 110. In some aspects, the server 140 may truncate the feedback information received from the application 118 prior to providing at least the portion of the feedback to the provider of the application 118. For example, some of the tagging information may be generated to create feedback that may be subsequently used by the server 140 to refine the tagging and categorization of content received from content providers. Feedback generated by such tagging information may not be relevant to the content providers and may not be provided to the content providers. Instead, such information may be used to configure the tagging and categorization of subsequently received items (e.g., to facilitate an increased likelihood that users will interact with the content provided via the server 140 and to increase the relevancy of content when published using the application 118). In yet another additional or alternative aspect, the application 118 may initiate transmission of a portion the feedback to the server 140 and transmission of a remainder of the feedback to the first content provider device 170. The portion transmitted to the server 140 may include the feedback specific to the categorization of and tagging of the content, and the remaining portion may include feedback associated with user interactions with the built-in features of the application 118 and the content 122. In an aspect, the tagging information may include information that indicates a particular piece of tagging information is specific to the server 140, to the first content provider device 170, or both, and the application 118 may generate and transmit the feedback based on the party specified in the tagging information. In an aspect, the feedback may be provided to the first content provider device 170 irrespective of whether the server 140 is accessible to the mobile device 110. In an aspect, the application 118 may generate the feedback irrespective of whether a network connection is available to the mobile device 110, and may store the feedback for subsequent transmission when a network connection becomes available.

In an aspect, the application 118 may selectively publish at least some of the content 122, or the server 140 may selectively provide at least some of the content 152 to the mobile device 110 in response to detecting change in a characteristic of the profile associated with the user of the mobile device 110. The change may be detected based at least in part on the feedback received from or generated by the application 118 executing on the mobile device 110. For example, the first content provider may be the bank and the application 118 may include the built-in functionality for checking investments. The user of the application 118 may have never utilized the built-in functionality for checking investments and thus, content provided to the application 118 by the server 140 may not include content including investment information. However, upon detecting user interaction with the built-in functionality for checking investments, the feedback generated by the application 118 may indicate that the user profile has been changed to indicate an interest in investment information. This may cause the server 140 to push content associated with investment information to the application 118 executing on the mobile device 110. As another example, the content received from the server 140 may include content associated with investment information, but that content may not be published to the user of the application 118 because the user has not utilized the built-in functionality for checking investments. Upon generating the feedback indicating the user has interacted with the built-in functionality for checking investments, the application 118 may determine whether the content 122 includes content associated with investment information and, if present, may publish the content associated with the investment information to the user via the application 118.

In an aspect, the application 118 may selectively publish at least some of the content 122, or the server 140 may selectively provide at least some of the content 152 to the mobile device 110 in response to detecting a pre-determined characteristic associated with the user interaction with the other content provided by or generated by the application 118 executing on the mobile device 110. For example, particular content may be provided or published in response to detecting that a threshold number of searches including a same keyword have been performed by the user during interaction with the application 118. The particular content may be associated with the keyword. As another example, the feedback may indicate that the user frequently interacts with multimedia content and rarely interacts with text only content. Thus, the server 140 may provide an increased amount of multimedia content to the application 118 and a decreased amount of text only content to the application 118. This may increase a likelihood that the user will interact with the content, enabling the first content provider to engage the user via the application 118 more frequently.

It is noted that while the system 100 has been described above with respect to the server 140 performing the categorization of and tagging of the content stored at the database 150, in an additional or alternative aspect, the application 118 may perform the categorization of and tagging of the content. The application 118 may provide information descriptive of a categorization of the content 122 and descriptive of one or more tags associated with the content 122 to the server 140. In an aspect, both the server 140 and the application 118 may perform categorization and tagging operations. For example, the application 118 may perform tagging of content to be used for generating feedback that is to be provided to the first content provider device 170, and the server 140 may perform tagging and categorization of content that is to be used to generate feedback for the server 140. Furthermore, in some aspects, all of the functions performed by the server 140 may be performed by the application 118 and the server 140 may be eliminated from the system 100. For example, the application 118 may transmit the request to the first content provider device 170, and the first content provider device 170 may provide the validation information and the information for retrieving the content from the database to the mobile device 110. In still other aspects, the functionality of the server 140 may be implemented in whole or in part by the first content provider device 170.

Further, it is noted that the mobile device 110 may include other applications (e.g., an application associated with the second content provider device 102) and that publication of content associated with other content providers (e.g., the second content provider) may be performed independent of the publication of content associated with the first content provider. Additionally, the content published via the applications may be paid content. For example, interaction with paid content may cause a financial account associated with the user of the mobile device 110 to be charged a particular amount. To illustrate, the content published via an application may include a request to donate a particular dollar amount to a charitable cause (e.g., cancer research, disaster relief, etc.), to pay a bill (e.g., a utility bill, a car payment, a mortgage payment, etc.), or to subscribe to a paid service (e.g., a podcasting service, a streaming music service, etc.), or another type of content service that may charge the financial account of the user of the mobile device 110.

Additionally, it is noted that the content may be provided from the server 140 to the mobile device 110 based on a classification of the user of the mobile device 110 into a group profile (e.g., users interested in a particular investment, etc.), and/or based on an individual profile associated with the user of the mobile device 110. Distribution of content to users classified within a particular group profile may make it easier to distribute some content to a large group of users with common interests, while distribution of content to users based on individual profiles may allow the content provider to interact with users on a more personal level tailored to the particular needs of the users. For example, a bank may provide different content to a user having a large amount of investments with and money deposited at the bank than a user having no investments and only a small amount of money deposited at the bank.

Thus, the system 100 provides a secure way to distribute and publish owned content from a variety of sources (e.g., news sources, social media sources, etc.) to users via applications executing on the users' mobile devices. This may increase a likelihood that the users receive the content, and that the content is accessible to the users on-demand. Furthermore, by storing the content at the database 120 of the mobile devices, the content is available irrespective of whether the mobile devices are connected to a network.

Figure 2:
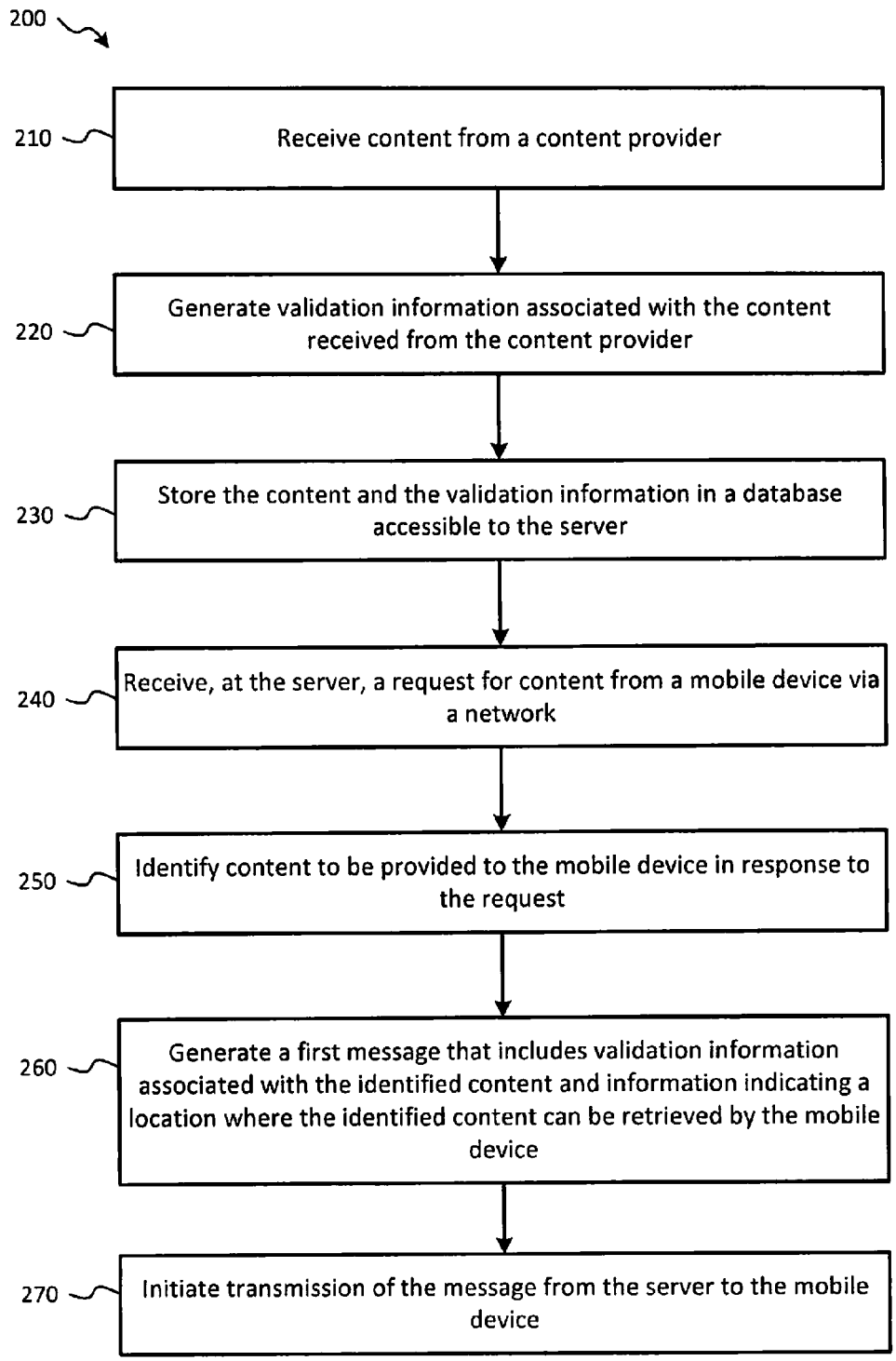
FIG. 2 is a flow diagram illustrating aspects of a method of distributing and publishing owned content via applications executing on a mobile device.

Referring to FIG. 2, a flow diagram illustrating aspects of a method of distributing and publishing owned content via applications executing on a mobile device is shown as a method 200. In an aspect, the method 200 may be performed by the server 140 of FIG. 1. At 210, the method 200 includes receiving content from a content provider, and, at 220, the method 200 includes generating validation information associated with the content received from the content provider. In an aspect, the validation information may be a checksum or a hash value generated using a hashing algorithm or another technique, as described with reference to FIG. 1. The validation information may be stored at a database accessible to the server. In an aspect, the server may generate a request for the content that includes a secret generated by the server, and the server may receive a response from the content provider (e.g., the first content provider device 170 of FIG. 1) identifying the content to be retrieved by the server. The response received from the content provider may include the secret generated by the server, and the server may verify the secret included in the response matches the secret included in the request prior to receiving the content at 210. Additionally, the response received from the content provider may include validation information that may be compared with the validation information generated by the server at 220. If the validation information generated by the server matches the validation information included in the response, the server may determine that the received content is valid content. At 230, the method 200 includes storing the content in the database accessible to the server. In an aspect, the content may be selectively stored at the database based on whether the validation information and/or the secret indicates the content is valid content. For example, if the secret included in the response matches the secret included in the request and the validation information included in the response matches the validation information generated by the server, then the server may determine that the content received from the content provider is valid content and may store the content in the database.

At 240, the method 200 includes receiving, at the server, a request for content from a mobile device via a network, and, at 250, the method 200 includes identifying content to be provided to the mobile device in response to the request. In an aspect, the request may be encrypted with a public-key of the server and may include a secret generated by the mobile device. In an aspect, the content may be provided based on profile information associated with a user of the mobile device, based on a group profile associated with a group of users of mobile devices that includes the user of the mobile device, or some other technique, as described with reference to FIG. 1. At 260, the method 200 includes generating a first message that includes validation information associated with the identified content and information indicating a location where the identified content can be retrieved by the mobile device. The validation information may enable the mobile device to validate that the retrieved content has not been altered or tampered with, and the location may correspond to a location of the database where the identified content can be retrieved by the mobile device. In an aspect, the first message may include the secret included in the request. At 270, the method 200 includes initiating transmission of the message from the server to the mobile device. The content may be stored and published at the mobile device via the application, as described above with reference to FIG. 1. The method 200 provides a secure way to distribute and publish owned content from a variety of sources (e.g., news sources, social media sources, etc.) to users via applications executing on the users' mobile devices. This may increase a likelihood that the users receive the content, and that the content is accessible to the users on-demand.

Figure 3:
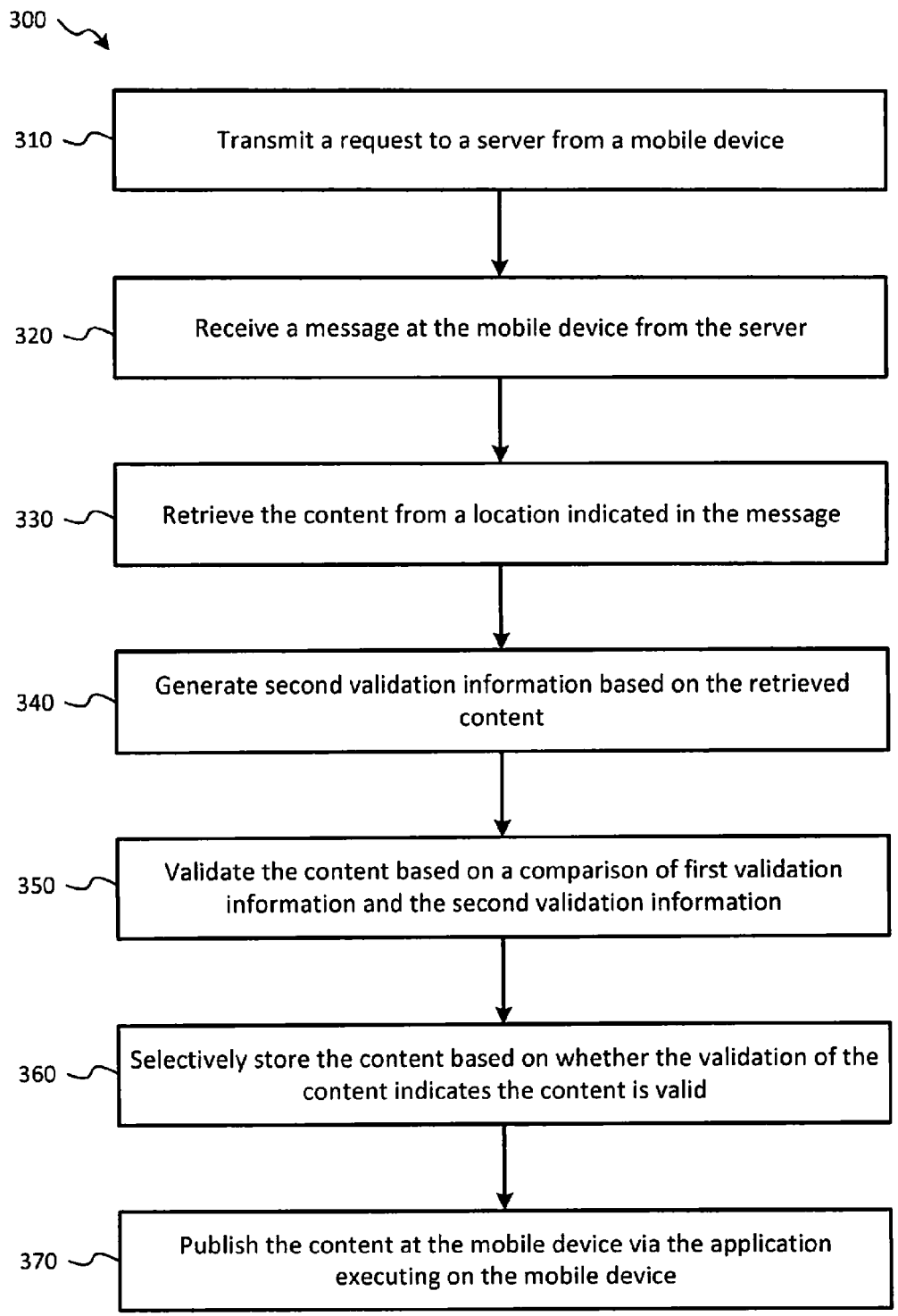
FIG. 3 is a flow diagram illustrating aspects of a method of receiving and publishing owned content via applications executing on a mobile device.

Referring to FIG. 3, a flow diagram illustrating aspects of a method of receiving and publishing owned content via applications executing on a mobile device is shown as a method 300. In an aspect, the method 300 may be performed by the mobile device 110 and the application 118 of FIG. 1. At 310, the method 300 includes transmitting a request to a server from a mobile device. In aspect, transmission of the request may be initiated by an application executing on the mobile device as a background process. In an aspect, the mobile device may generate a secret and the secret may be included in the request. The secret may be a onetime use secret, a secret that is valid for a period of time or a particular number of requests, or a secret that is valid for a combination of a period of time and a particular number of requests, as described above with reference to FIG. 1. In an aspect, the request may be encrypted using a public-key of the server. At 320, the method 300 includes receiving a message at the mobile device from the server. The server may transmit the message to the mobile device in response to receiving the request, and the message may include first validation information and information indicating a location where the mobile device can retrieve content. In an aspect, the location may be a location of a database (e.g., the database 150 of FIG. 1) or a location of the content within the database. In an aspect, the message may include the first validation information and the secret transmitted to the server by the mobile device.

At 330, the method 300 includes retrieving the content from the location indicated in the message, and, at 340, the method 300 includes generating second validation information based on the retrieved content. In an aspect, the mobile device may determine whether the secret included in the message received from the server matches the secret transmitted to the server by the mobile device, and may selectively retrieve the content based on a determination of whether the secret included in the message received from the server matches the secret transmitted to the server by the mobile device. For example, in response to a determination that the secret included in the message received from the server matches the secret transmitted to the server by the mobile device, the mobile device may retrieve the content from the location indicated in the message, and may generate the second validation information, as described above with reference to FIG. 1. However, in response to a determination that the secret included in the message received from the server does not match the secret transmitted to the server by the mobile device, the mobile device may not retrieve the content from the location indicated in the message, as described above with reference to FIG. 1.

At 350, the method 300 includes validating the content based on a comparison of the first validation information and the second validation information. The result of the validation may indicate whether the retrieved content is valid content and/or whether the retrieved content has been altered or tampered with. At 360, the method 300 includes selectively storing the content based on whether the validation of the content indicates the content is valid. In an aspect, the mobile device may selectively store the content only when the result of the validation indicates that the retrieved content is valid and the secret included in the message received from the server does not match the secret transmitted to the server by the mobile device. The content may be stored for subsequent publication at the mobile device via the application. At 370, the method 300 includes publishing the content at the mobile device via the application executing on the mobile device. Publishing the content may include presenting the content at a display device of the mobile device, as described with reference to FIG. 1.

In an aspect, method 300 may publish the content using content tailoring techniques, such as monitoring the user's interaction with the application to detect that the user is interacting with a particular built-in functionality of the application executing on the mobile device, and determining whether the content stored at the mobile device includes content related to the built-in functionality. In response to a determination that the content stored at the mobile device includes content related to the built-in functionality, the application may publish the content related to the built-in functionality. The content tailoring techniques may also include detecting a change in a profile associated with the user of the mobile device. At least a portion of the content published at the mobile device may be identified based on the change in the profile. Additionally, the content tailoring techniques may include monitoring the user's interaction with the application. This may include tracking a number of times that a particular search term is provided to a search feature of the application executing on the mobile device. The application may determine whether the number of times that the particular search term is provided to the search feature of the application exceeds a threshold number of times, and, in response to a determination that the number of times that the particular search term is provided to the search feature of the application exceeds the threshold number of times, publishing content related to the particular search term. Content tailoring may also include publishing at least a portion of the content at the mobile device in response to detecting a pre-determined characteristic associated with the user interaction with content provided by or generated by the application (e.g., built-in functionality), such as accessing a particular feature of the application for the first time. The content tailoring may be used to publish content at the mobile device even when the mobile device is offline, such as when no network connections are available, or when network connections are available, but the mobile device is not connected to one of the available networks.

Although not shown in FIG. 3, in an aspect, the method 300 may include generating feedback including information descriptive of whether the user of the mobile device interacts with the published content. The feedback may be periodically provided to the server, to a provider of the application executing on the mobile device, to a content provider that provided the content to the server, or both. The method 300 provides a secure way to distribute and publish owned content from a variety of sources (e.g., news sources, social media sources, etc.) to users via applications executing on the users' mobile devices. This may increase a likelihood that the users receive the content, and that the content is accessible to the users on-demand. Additionally, the method 300 provides for generating feedback indicating whether the user interacts with the content.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A non-transitory computer-readable storage medium storing instructions that, when executed by a processor, cause the processor to perform operations comprising:
receiving a request for content at a server via a network from a mobile device;
identifying content to be provided to the mobile device in response to the request;
generating a first message that includes validation information associated with the identified content and information indicating a location where the identified content can be retrieved by the mobile device, wherein the validation information enables the mobile device to validate that the retrieved content has not been altered;
initiating transmission of the first message from the server to the mobile device;
receiving a second message from the mobile device indicating that the content retrieved by the mobile device is invalid;
determining whether the content, as stored at the location indicated in the first message, is invalid or the content was corrupted or altered during retrieval of the content by the mobile device;
in response to a determination that the content, as stored at the location indicated in the first message, is invalid, isolating the content stored at the location; and
in response to a determination that the content was corrupted or altered during retrieval of the content by the mobile device, reconfiguring a connection to the location and transmitting a third message to the mobile device, wherein the third message includes information associated with the reconfigured connection.

2. The non-transitory computer-readable storage medium of claim 1, wherein the operations include:
receiving the content at the server from a content provider; and
storing the content and the validation information at a database accessible to the server, wherein the information indicating the location where the identified content can be retrieved by the mobile device includes information associated with accessing the database.

3. The non-transitory computer-readable storage medium of claim 2, wherein the operations include encrypting the content stored at the database, and wherein the content is encrypted when retrieved by the mobile device.

4. The non-transitory computer-readable storage medium of claim 2, wherein the request is generated by an application executing on the mobile device, and wherein the operations include:
determining, based on information included in the request, a provider of the application executing on the mobile device; and
identifying the content to be provided to the mobile device based on a determination that the content was received from sources associated with the provider.

5. The non-transitory computer-readable storage medium of claim 4, wherein the request is encrypted, and wherein the operations include decrypting the request to determine the information included in the request.

6. The non-transitory computer-readable storage medium of claim 4, wherein the sources associated with the provider of the application are operated by the provider of the application, wherein other sources that are not associated with the provider of the application are associated with other providers of other applications, and wherein other content provided by the other sources is not identified as content that is to be provided to the mobile device in response to the request.

7. The non-transitory computer-readable storage medium of claim 6, wherein the identified content is owned content.

8. A method comprising:
receiving a request for content at a server via a network from a mobile device;
identifying content to be provided to the mobile device in response to the request;
generating a first message that includes validation information associated with the identified content and information indicating a location where the identified content can be retrieved by the mobile device, wherein the validation information enables the mobile device to validate, subsequent to retrieving the content, that the content has not been altered;
initiating transmission of the first message from the server to the mobile device;

receiving a second message from the mobile device indicating that the content retrieved by the mobile device is invalid;

determining whether the content, as stored at the location indicated in the first message, is invalid or the content was corrupted or altered during retrieval of the content by the mobile device;

in response to a determination that the content, as stored at the location indicated in the first message, is invalid, isolating the content stored at the location; and in response to a determination that the content was corrupted or altered during retrieval of the content by the mobile device, reconfiguring a connection to the location and transmitting a third message to the mobile device, wherein the third message includes information associated with the reconfigured connection.

9. The method of claim 8, wherein the request is initiated by an instance an application executing on the mobile device, wherein the method includes:

decrypting the request to determine information included in the request;

determining a provider of the application executing on the mobile device based on the information included in the request; and identifying the content to be provided to the mobile device based on a determination that the content was received from sources associated with the provider.

10. The method of claim 9, wherein the method includes:
receiving the content from a content provider;
generating validation information associated with the content received from the content provider; and
storing the content and the validation information in a database accessible to the server encrypting the content selectively stored at the database, and wherein the content is encrypted when retrieved by the mobile device is encrypted.

11. The method of claim 10, wherein the method includes:
categorizing the content selectively stored at the database based on information included the content, based on whether the content includes multimedia content, based on whether the content is received from a social media source, based on a type of the social media source, based on a profile associated with a user of the mobile device, based on a group profile associated with a group of users of mobile devices that includes the user of the mobile device, or a combination thereof; and
tagging the content stored at the database based at least in part on a categorization of the content.

12. The method of claim 11, wherein the method includes identifying the content to be provided to the mobile device based on based on the profile associated with the user of the mobile device, based on the group profile, based on detection of a change in the profile associated with the user of the mobile device, based on detection of a change in the group profile, or a combination thereof.

13. The method of claim 12, wherein the identified content includes content owned by the provider of the application executing on the mobile device.

14. The method of claim 13, wherein the method includes receiving feedback at the server from the application executing on the mobile device, wherein the feedback includes information representative of user interaction with the content retrieved by the mobile device, and wherein the feedback is generated based on a categorization of the content and a tagging of the content.

15. The method of claim 14, wherein the method includes providing at least a portion of the feedback received from the mobile device to the provider of the application.

16. An apparatus comprising:
a processor; and
a memory communicatively coupled to the processor, the memory storing instructions that, when executed by the processor, cause the processor to perform operations comprising:
receiving content from a content provider;
generating validation information associated with the content received from the content provider;
storing the content and the validation information in a database accessible to the processor;
receiving a request for content from a mobile device via a network;
identifying content to be provided to the mobile device in response to the request;
generating a first message that includes validation information associated with the identified content and information indicating a location where the identified content can be retrieved by the mobile device, wherein the validation information enables the mobile device to validate, subsequent to retrieving the content, that the content has not been altered, and wherein the location corresponds to a location of the database where the identified content can be retrieved by the mobile device;
initiating transmission of the first message to the mobile device;
receiving a second message from the mobile device indicating that the content retrieved by the mobile device is invalid;
determining whether the content, as stored at the location indicated in the first message, is invalid or the content was corrupted or altered during retrieval of the content by the mobile device;
in response to a determination that the content, as stored at the location indicated in the first message, is invalid, isolating the content stored at the location; and
in response to a determination that the content was corrupted or altered during retrieval of the content by the mobile device, reconfiguring a connection to the location and transmitting a third message to the mobile device, wherein the third message includes information associated with the reconfigured connection.

17. The apparatus of claim 16, wherein the operations include:
categorizing the content stored at the database based on information included the content, based on whether the content includes multimedia content, based on whether the content is received from a social media source, based on a type of the social media source, based on a profile associated with a user of the mobile device, based on a group profile associated with a group of users of mobile devices that includes a user of the mobile device, or a combination thereof; and
tagging the content stored at the database based at least in part on a categorization of the content.

18. The apparatus of claim 17, wherein the operations include identifying at least some of the content to be provided to the mobile device in response to detecting a change in a characteristic of the profile associated with the user of the mobile device, wherein the change is detected based at least in part on feedback received from an application executing on the mobile device.

19. An apparatus comprising:
a processor; and
a memory communicatively coupled to the processor, the memory storing instructions that, when executed by the processor, cause the processor to perform operations comprising:
transmitting a request to a server from a mobile device, wherein the request is initiated by an application executing on the mobile device;
receiving a first message at the mobile device from the server, wherein the server transmits the first message to the mobile device in response to the request, and wherein the first message includes first validation information and information indicating a location where the mobile device can retrieve content;
retrieving the content from the location indicated in the first message;
generating second validation information based on the retrieved content;
validating the content based on a comparison of the first validation information and the second validation information;
selectively storing the content based on whether the validation of the content indicates the content is valid, wherein the content is stored for subsequent publication at the mobile device via the application;
in response to the validation indicating that the content retrieved by the mobile device is invalid, transmitting a second message to the server, the second message indicating that the content retrieved by the mobile device is invalid, wherein the server, in response to receiving the second message, determines whether the content, as stored at the location indicated in the first message, is invalid or the content was corrupted or altered during retrieval of the content by the mobile device,
in response to a determination that the content, as stored at the location indicated in the first message, is invalid, isolating the content stored at the location; and
in response to a determination that the content was corrupted or altered during retrieval of the content by the mobile device, reconfiguring a connection to the location and transmitting a third message to the mobile device, wherein the third message includes information associated with the reconfigured connection.

20. The apparatus of claim 19, wherein the application initiates transmission of the request while executing as a background process on the mobile device, and wherein application causes the mobile device to periodically transmit the request independent of user interaction with the application.

21. The apparatus of claim 20, wherein a result of a validation of the content indicates whether the content has been tampered with or altered, wherein, when the content has been tampered with or altered, the result of the validation indicates that the content is invalid, and wherein only content associated with validation results indicating valid content are selectively stored at the mobile device.

22. The apparatus of claim 21, wherein the operations include transmitting information to the server indicating that the content has been altered or tampered with in response to a determination that the content is invalid.

23. The apparatus of claim 19, wherein the content is selectively stored at a database and is published via the application independent of whether a network connection is accessible to the mobile device.

24. The apparatus of claim 23, wherein the operations include:
publishing the content at the mobile device via the application executing on the mobile device, wherein publication of the content includes presenting the content during user interaction with the application executing on the mobile device; and
determining whether a user of the mobile device interacts with the published content.

25. The apparatus of claim 24, wherein the operations include publishing at least a portion of the content at the mobile device via the application in response to detecting a pre-determined characteristic associated with the user interaction with other content provided by or generated by the application executing on the mobile device.

26. The apparatus of claim 24, wherein the operations include publishing the content at the mobile device using content tailoring, wherein content tailoring includes identifying content likely to be of interest to a user of the mobile device based on tagging information and categorization information, wherein the tagging information and the categorization information are generated by the server and included in the content, and wherein the content tailoring is performed independent of whether a network connection is accessible to the mobile device.

27. The apparatus of claim 24, wherein the operations include generating feedback including information descriptive of whether the user of the mobile device interacts with the published content and includes information descriptive of user interaction with other content provided by or generated by the application executing on the mobile device.

28. The apparatus of claim 27, wherein the operations include periodically providing the feedback to the server.

29. The apparatus of claim 27, wherein the operations include periodically providing the feedback to a provider of the application executing on the mobile device.

30. The apparatus of claim 27, wherein the operations include periodically providing the feedback to the server, wherein the server provides at least a portion of the feedback to a provider of the application executing on the mobile device.

31. A method comprising:
transmitting a request to a server from a mobile device, wherein the request is initiated by an application executing on the mobile device;
receiving a first message at the mobile device from the server, wherein the server transmits the first message to the mobile device in response to the request, and wherein the first message includes first validation information and information indicating a location where the mobile device can retrieve content;
retrieving the content from the location indicated in the first message;
generating second validation information based on the retrieved content;
validating the content based on a comparison of the first validation information and the second validation information;
selectively storing the content based on whether the validation of the content indicates the content is valid, wherein the content is stored for subsequent publication at the mobile device via the application;
transmitting a second message to the server, the second message indicating that the content retrieved by the mobile device is invalid, wherein the server, in response to receiving the second message, determines whether the content, as stored at the location indicated in the first message, is invalid or the content was corrupted or altered during retrieval of the content by the mobile device, in response to a determination that the content, as stored at the location indicated in the first message, is invalid, isolating the content stored at the location; and in response to a determination that the content was corrupted or altered during retrieval of the content by the mobile device, reconfiguring a connection to the location and transmitting a third message to the mobile device, wherein the third message includes information associated with the reconfigured connection.

32. The method of claim 31, wherein the application initiates transmission of the request while executing as a background process on the mobile device, and wherein application causes the mobile device to periodically transmit the request independent of user interaction with the application.

33. The method of claim 31, wherein the method includes:

publishing the content at the mobile device via the application executing on the mobile device, wherein publication of the content includes presenting the content during user interaction with the application executing on the mobile device;

determining whether a user of the mobile device interacts with the published content; and generating feedback, wherein the feedback includes information descriptive of whether the user of the mobile device interacts with the published content, and wherein the feedback includes information descriptive of user interaction with other content provided by or generated by the application executing on the mobile device; and periodically providing the feedback to the server, periodically providing the feedback to a provider of the application executing on the mobile device, or both.

34. The method of claim 33, wherein the method includes publishing at least a portion of the content at the mobile device via the application in response to detecting a predetermined characteristic associated with the user interaction with the other content provided by or generated by the application executing on the mobile device.

35. The method of claim 33, wherein the content is published via the application independent of whether a network connection is accessible to the mobile device.

36. The method of claim 33, wherein the method includes:

detecting that the user is interacting with a particular built-in functionality of the application executing on the mobile device;

determining whether the content stored at the mobile device includes content related to the built-in functionality; and in response to a determination that the content stored at the mobile device includes content related to the built-in functionality, publishing the content related to the built-in functionality.

37. A non-transitory computer-readable storage medium storing instructions that, when executed by a processor, cause the processor to perform operations comprising:

transmitting a request to a server from a mobile device, wherein the request is initiated by an application executing on the mobile device;

receiving a first message at the mobile device from the server, wherein the server transmits the first message to the mobile device in response to the request, and wherein the first message includes first validation information and information indicating a location where the mobile device can retrieve content;

retrieving the content from the location indicated in the first message;

generating second validation information based on the retrieved content;

validating the content based on a comparison of the first validation information and the second validation information;

selectively storing the content based on whether the validation of the content indicates the content is valid, wherein the content is stored for subsequent publication at the mobile device via the application;

transmitting a second message to the server, the second message indicating that the content retrieved by the mobile device is invalid, wherein the server, in response to receiving the second message, determines whether the content, as stored at the location indicated in the first message, is invalid or the content was corrupted or altered during retrieval of the content by the mobile device, in response to a determination that the content, as stored at the location indicated in the first message, is invalid, isolating the content stored at the location; and in response to a determination that the content was corrupted or altered during retrieval of the content by the mobile device, reconfiguring a connection to the location and transmitting a third message to the mobile device, wherein the third message includes information associated with the reconfigured connection.

38. The non-transitory computer-readable storage medium of claim 37, wherein the operations include:

publishing the content at the mobile device via the application executing on the mobile device, wherein publication of the content includes presenting the content during user interaction with the application executing on the mobile device, and wherein the content is published via the application independent of whether a network connection is accessible to the mobile device; and determining whether a user of the mobile device interacts with the published content; and generating feedback, wherein the feedback includes information descriptive of whether the user of the mobile device interacts with the published content, and wherein the feedback includes information descriptive of user interaction with other content provided by or generated by the application executing on the mobile device.

39. The non-transitory computer-readable storage medium of claim 38, wherein the content is published using content tailoring.

40. The non-transitory computer-readable storage medium of claim 39, wherein the content tailoring includes detecting a change in a profile associated with the user of the mobile device, wherein at least a portion of the content published at the mobile device is identified based on the change in the profile.

41. The non-transitory computer-readable storage medium of claim 40, wherein the content tailoring includes:

monitoring the user's interaction with the application, wherein the monitoring includes tracking a number of times that a particular search term is provided to a search feature of the application executing on the mobile device;

determining whether the number of times that the particular search term is provided to the search feature of the application exceeds a threshold number of times; and in response to a determination that the number of times that the particular search term is provided to the search feature of the application exceeds the threshold number of times, publishing content related to the particular search term.

42. The non-transitory computer-readable storage medium of claim 39, wherein the content tailoring includes publishing at least a portion of the content at the mobile device in response to detecting a pre-determined characteristic associated with the user interaction with the other content provided by or generated by the application executing on the mobile device.

43. The non-transitory computer-readable storage medium of claim 38, wherein the operations include:

categorizing the content selectively stored at the mobile device based on information included each content, based on whether the content includes multimedia content, based on whether the content is received from a social media source, based on a type of the social media source, based on a profile associated with a user of the mobile device, based on a group profile associated with a group of users of mobile devices that includes a user of the mobile device, or a combination thereof; and tagging the content stored at the mobile device based at least in part on a categorization of the content, wherein the content is identified for publication based, at least in part, on the tagging of the content and the categorization of the content.

44. The non-transitory computer-readable storage medium of claim 43, wherein the operations include selectively publishing the content via the application executing on the mobile device in response to detecting change in a characteristic of the profile associated with the user of the mobile device, wherein the change is detected based at least in part on user interaction with the application executing on the mobile device.

45. The non-transitory computer-readable storage medium of claim 44, wherein the operations include providing information descriptive of a categorization of the content and descriptive of one or more tags associated with the content to the server.

\* \* \* \* \*